(12) United States Patent
Eaton et al.

(10) Patent No.: US 7,157,811 B2
(45) Date of Patent: Jan. 2, 2007

(54) METHOD AND APPARATUS FOR SENSING VOLTAGE IN AN AUTOMATIC TRANSFER SWITCH SYSTEM

(75) Inventors: Zane C. Eaton, Plymouth, WI (US); Eric Albsmeier, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 464 days.

(21) Appl. No.: 10/375,972

(22) Filed: Feb. 28, 2003

(65) Prior Publication Data
US 2004/0169421 A1 Sep. 2, 2004

(51) Int. Cl.
*H01H 35/00* (2006.01)
(52) U.S. Cl. .......................................... 307/80; 307/129
(58) Field of Classification Search .................. 307/80, 307/129
See application file for complete search history.

(56) References Cited

U.S. PATENT DOCUMENTS

| | | | |
|---|---|---|---|
| 4,419,619 A | 12/1983 | Jindrick et al. | |
| 4,623,265 A | 11/1986 | Poyser | |
| 4,747,061 A * | 5/1988 | Lagree et al. | 700/298 |
| 4,931,725 A * | 6/1990 | Hutt et al. | 324/142 |
| 5,198,698 A * | 3/1993 | Paul et al. | 307/64 |
| 5,345,409 A | 9/1994 | McGrath et al. | |
| 5,369,355 A | 11/1994 | Roe | |
| 5,373,433 A | 12/1994 | Thomas | |
| 5,581,133 A * | 12/1996 | Smith et al. | 307/64 |
| 5,621,254 A | 4/1997 | Takeda et al. | |
| 5,790,391 A * | 8/1998 | Stich et al. | 363/24 |
| 5,923,141 A * | 7/1999 | McHugh | 318/701 |
| 2002/0175897 A1* | 11/2002 | Pelosi | 345/158 |

FOREIGN PATENT DOCUMENTS

JP 406013252 1/1994
JP 06217555 A * 8/1994

OTHER PUBLICATIONS

Machine translation of ONO, Akihisa (JP 06217555 A), Aug. 5, 1994.*

* cited by examiner

*Primary Examiner*—Brian Sircus
*Assistant Examiner*—Daniel Cavallari
(74) *Attorney, Agent, or Firm*—Quarles & Brady LLP

(57) ABSTRACT

An Automatic Transfer Switch System includes a control circuit in which high frequency transformers, designed to operate linearly in a frequency range above the operating frequency range of utility-level power, are employed for voltage sensing. An output signal from a high frequency line matching transformer is received by a microprocessor which evaluates the signal for both a voltage level and frequency and uses these values as indices to an empirically-derived look-up table which provides an actual voltage level to the microprocessor. The actual voltage value can then be evaluated by the microprocessor to determine if and when the power delivered to a load should be supplied by a first or a second power supply.

22 Claims, 4 Drawing Sheets

METHOD AND APPARATUS FOR SENSING VOLTAGE IN AN AUTOMATIC TRANSFER SWITCH SYSTEM

BACKGROUND OF THE INVENTION

The present invention is related to the field of power switching devices and more particularly to voltage sensing and regulation in an automatic transfer switch system.

Automatic Transfer Switch (ATS) systems for switching between two or more power sources are well known in the art. ATS systems sense a voltage level provided by each of two or more AC power sources and automatically switch the power delivered to a load from a first AC power source to a second AC power source when the delivered voltage falls below a selected value. These systems are commonly provided, for example, between two or more AC power generators, between an AC power generator and a utility line, or in other combinations in which multiple AC power sources are used. Such systems are particularly useful in switching an appropriate alternate source of power into a system when there is a power drop or power failure situation, including blackout and brown out situations.

ATS circuits generally include a voltage sensing circuit for sensing a level of the output voltage supplied by each of the AC power sources. At an input stage, the voltage sensing circuits typically comprise transformers designed to provide a linear voltage transformation when operated in a frequency range of about 50–60 Hz, the typical operating frequencies for AC power sources. The transformer output voltage signal is evaluated to determine whether the supplied line voltage of the operating power source has fallen below an acceptable level or failed and, if appropriate, the power source is switched out and a second power source is switched in.

While prior art voltage sensing circuits are generally successful in providing an accurate sensing signal, to provide a linear transfer characteristic and prevent saturation of the core at these relatively low frequencies of operation, the transformers provided in these systems are typically large, heavy, and relatively expensive. The transformers therefore contribute significantly to the overall size and cost of the system. ATS systems which use these types of voltage sensing circuits, therefore, are also typically large and expensive. As ATS devices are used as backup systems, it is desirable to provide an ATS system which is small and inexpensive, and which can be stored easily.

SUMMARY OF THE INVENTION

An object of the invention is to provide an automatic transfer switch circuit for switching utility-level power supplied to a load between a first AC power source and a second AC power source. A first high frequency line transformer is electrically connected to a power supply line from the first AC power source and a second high frequency line transformer electrically connected to a power supply line from the second AC power source. A processing unit is electrically connected to an output of each of the first and second high frequency line transformers and receives a sensed voltage signal from the high frequency transformers indicative of a level of output voltage of the respective power sources. Based on the sensed voltage signal, the processing unit is programmed to determine an actual level of voltage supplied by each of the first and second AC power sources. The processing unit is further programmed to switch the power applied to the load from one of the first and second power sources to the other of the first and second power sources when the actual voltage applied to the load falls below a predetermined value. The high frequency line matching transformer provided in the automatic transfer section is preferably designed to operate linearly in an operational frequency range of 200–4 kHz, while the supplied AC power operates in a fifty to sixty Hertz range.

Another object of the invention is to provide an automatic transfer switch in which the processing unit is electrically connected to a memory component storing a look-up table. The look-up table correlates the sensed voltage level and a frequency of the sensed voltage signal to an actual voltage output from the one of the first and second AC power sources. The processing unit is programmed to determine the frequency and the voltage level of the sensed signal and to correlate the frequency and voltage level of the sensed signal to the actual voltage level in the look-up table.

In another aspect of the invention, the processor is further connected to a temperature sensor. The processor uses the sensed temperature to adjust the actual voltage level, either through an empirically-derived equation or the use of a look-up table.

Another object of the invention is to provide a voltage sensing circuit for sensing a level of an applied utility line voltage, the voltage sensing circuit comprising a processing unit and a high frequency line matching transformer and a temperature sensor. The high frequency line matching transformer is electrically connected to an AC power source and to the processing unit to provide a sensed voltage level to the processing unit, and a temperature sensor coupled to the processing unit to provide a temperature sense signal. The processing unit samples a level of the sensed voltage from the high frequency line matching transformer, calculates a frequency of the sensed voltage and determines an actual voltage provided by the AC power source based on the sensed voltage, frequency, and temperature.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
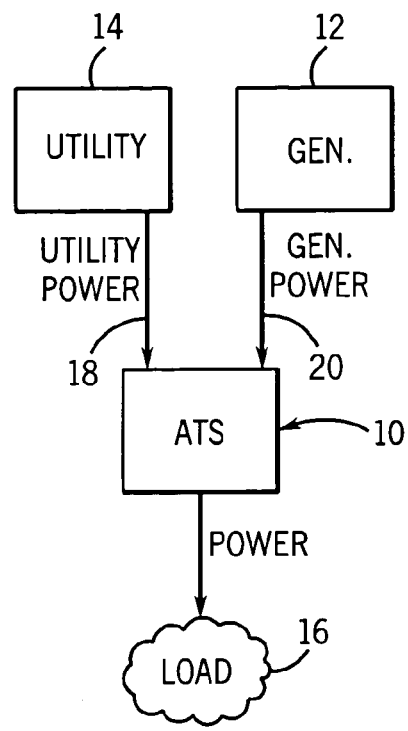
FIG. 1 is a block diagram of an Automatic Transfer Switch System connected to a load and to first and second AC power sources.

Referring now to the Figures and more particularly to FIG. 1 an automatic transfer switch 10 is shown electrically connected to receive utility-level input power from an AC power generator 12 and a utility power source 14. The automatic transfer switch (ATS) 10 senses the voltage input on the utility power line 18 from the utility power source 14, and switches power directed to the load 16 from the utility power line 18 to the generator power line 20 when the input voltage on the utility power line 18 from the utility power source 14 falls below a predetermined value. The predetermined value can be selected, for example, to prevent the load from being affected by a brown out or black out condition, or to optimize performance of the load. The ATS 10 also monitors the input voltage from the generator 12 and switches back to the utility power source 14 if the generator voltage falls due to, for example, a lack of fuel or other reasons. By continually monitoring the input from both power sources 12 and 14, the ATS 10 can determine which power source is the most suitable for use at any given time, and maintain a relatively constant supply to the load 16. The power supplied to the ATS 10 on the utility power line 18 and generator power line 20 is a utility-level line voltage, typically a three phase line voltage such as a 120/240/360 volt supply line operating at 60 Hz.

Figure 2:
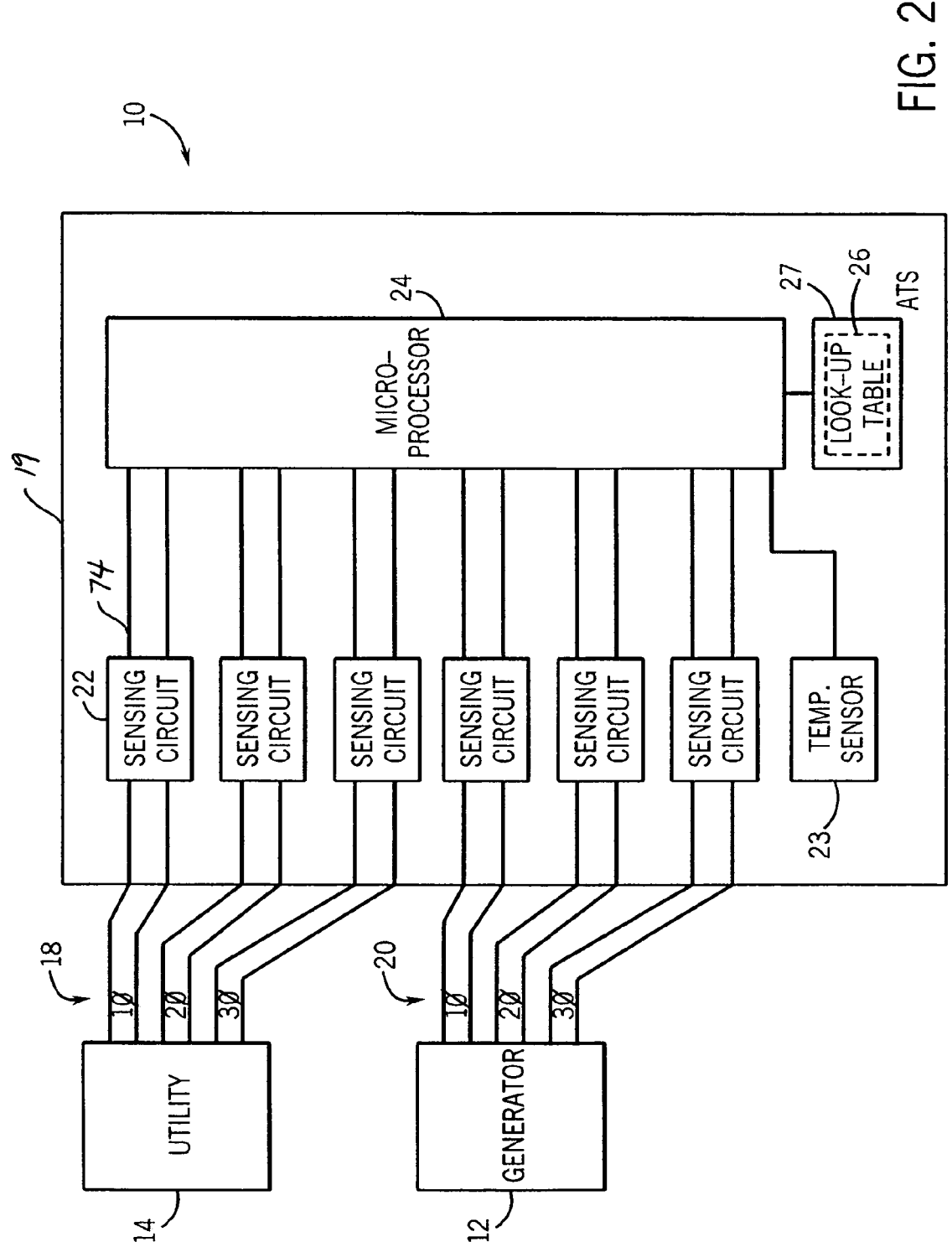
FIG. 2 is a block diagram of a control circuit incorporated in the automatic transfer switch system of FIG. 1.

Referring now to FIG. 2, a block diagram of a control circuit 19 provided in the ATS 10 is shown. The control circuit 19 comprises a plurality of sensing circuits 22, a processing unit, here a microprocessor 24, and a memory component 27 storing a look-up table 26. The sensing circuits 22 are each coupled to receive a line voltage from one phase of the utility-level three phase input power lines 18 and 20. The sensing circuits 22 filter and scale the line voltages and provide a sensed voltage 74 to the microprocessor 24 for each phase of the input voltage. The microprocessor evaluates the voltage 74 along with a calculated frequency 30 to determine the actual line voltage output level ($V_{actual}$) 32 (FIG. 5. 6) for each phase of the respective AC power supply 12 or 14 with reference to either empirically-derived equation or the look up table 26, as described more fully below. In some applications, the control circuit 19 can also include temperature sensors 23, for sensing the ambient temperature of operation, also as described below. Preferably, a voltage, sensing circuit 22 is provided for each phase of the input line voltage although a sensing circuit 22 is not necessary on all phases of the input line in all applications.

Figure 3:
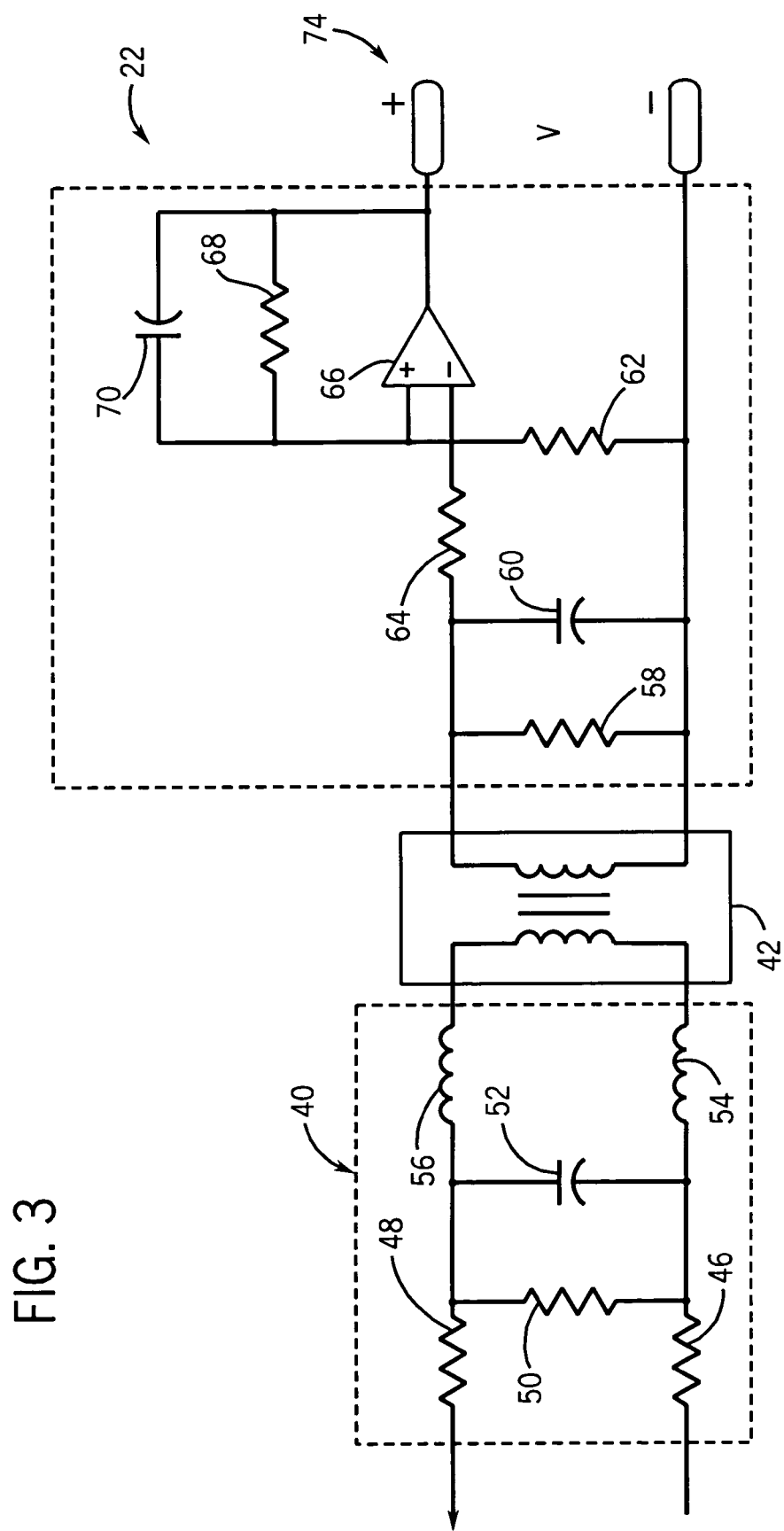
FIG. 3 is a circuit diagram of a voltage sensing circuit of the control circuit of FIG. 2.

Referring now to FIG. 3, a circuit diagram of one embodiment of a sensing circuit 22 which can be used in conjunction with the present invention is shown. The sensing circuit 22 generally comprises an input voltage divider and filter 40, a high frequency line matching transformer 42, and a differential op amp and filtering stage 44. The high frequency line matching transformer 42 is a small inexpensive transformer designed for audio or communication applications and is designed to operate with relatively low level voltage signals and to operate linearly at a relatively high frequency, outside of the frequency range of the AC power supplies 12 and 14. The transfer characteristics of the transformer 42 are non-linear at the utility-level input line frequency which, as described here, is typically sixty hertz. Although a high frequency line matching transformer is described, any small transformer designed for linear operation in a frequency range higher than the utility line frequency range could be emplyed.

Referring still to FIG. 3, the voltage divider and filter 40 comprises a pair of resistors 46 and 48, the input of the resistor 46 being connected to a first side of the selected input phase and the input of resistor 48 being connected to the opposing side of the selected input phase. The parallel combination of a resistor 50 and a capacitor 52 is connected from the output of resistor 46 to the output of the resistor 48.

The resistors 46, 48, and 50 form a resistive divider, wherein the resistors 46 and 48 are matched to provide an even voltage drop across the respective resistor and are relatively large as compared to resistor 50, such that the voltage across resistor 50 is dropped to a voltage range level appropriate for the line transformer 42 and microprocessor 24. Each end of the parallel combination of the resistor 50 and capacitor 52 is coupled to an inductor 54 and 56, the outputs of the inductors 54 and 56 being coupled to the line matching transformer 42, such that the line matching transformer 42 receives a scaled and filtered voltage signal proportional to the input signal provided to the sensing circuit 22.

At the output of the transformer 42, the signal is again filtered through the RC network of resistor 58 and capacitor 60, and then through the op amp filter circuit comprising matching resistors 62 and 64 connected to the positive and negative inputs of the op amp 66, respectively, and a filter circuit comprising resistor 68 and capacitor 70 in a feedback loop between the output and the negative input of the op amp 66.

As noted above, the line matching transformer 42 is designed for use in telecommunications, instrumentation, and other applications in which operational frequencies are higher than the utility-level operational frequency of the ATS 10, and is intended to be used in an expected frequency range of about 200 Hz to 4 kHz. The transfer characteristics of the transformer 42 are linear in the expected frequency range, but are non-linear in the typical utility-level power supply frequency range of sixty hertz. Therefore, the sensed voltage 74 must be evaluated to determine the actual input line voltage.

Referring now also to FIG. 2, the output of the op amp 66 is connected to microprocessor 24, which is programmed to determine an actual voltage supplied by each phase of the input voltage based on the voltage signal 74 received from the op amp 66. The microprocessor 24 can calculate the actual voltage level based on one or more empirically-derived equation as, for example, when the relationship between the sensed voltage 74 and actual voltage is substantially linear, or correlate sensed voltages to actual voltages with reference to the look-up table 26 stored in a memory component 27, as described below.

Figure 4:
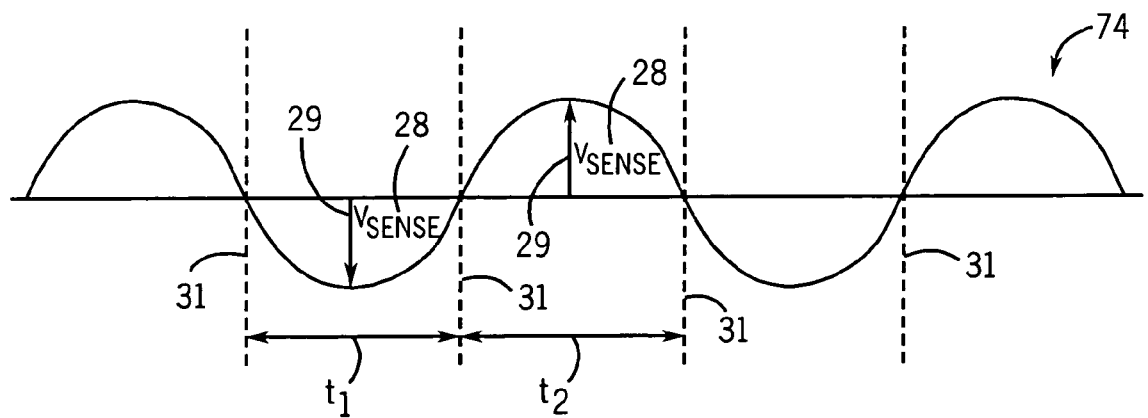
FIG. 4 is a wareform illustrating the voltage output from the circuit of FIG. 3.

The microprocessor 24 includes a conventional digital to analog converter (not shown) which receives the analog voltage signal 74 from the sensing circuit 22 and converts the analog voltage signal 74 to a digital value for analysis. Referring now to FIG. 4, the microprocessor 24 determines the zero crossing points 31 for the AC voltage signal 74 by monitoring the voltage signal 74 or by monitoring a conventional zero crossing detector circuit (not shown). The microprocessor 24 calculates the frequency 30 of the voltage signal based on a calculated time $t_1$–$t_2$ between zero crossing points 31. The microprocessor 24 further samples the sensed voltage 74, at a predetermined time 29 after or between the zero crossings 31 and preferably at the approximate peak of the voltage 74, and stores the sampled input as the sensed voltage value $V_{sense}$ 28.

To establish a relationship between the sensed voltage $V_{sense}$ 28 and actual voltage $V_{actual}$ 32, a range of tests are run in which the power sources 12 and 14 are operated over a range of possible voltages, and the corresponding sensed voltage 74 at the output of the sensing circuit 22 is sensed or recorded. Based on this data, an empirically-derived equation or a look-up table can be established. Similarly, the frequency of the sensed voltage signal and the ambient operations temperature can be monitored, and equations or look-up tables for correlating these parameters to adjustments in the actual voltage can be determined. Depending on the acquired empirical data, the microprocessor can be programmed to calculate the actual voltage using an empirically-derived equation, or to retrieve the value from a look-up table. Empirically-derived equations are preferred when the data is substantially linear, and can be represented in a known equation, for example, of the form y=mx+b. Where a more complicated non-linear relationship is derived, a look-up table is preferred, although in some applications, equations will also be useful for complex data.

Figure 5:
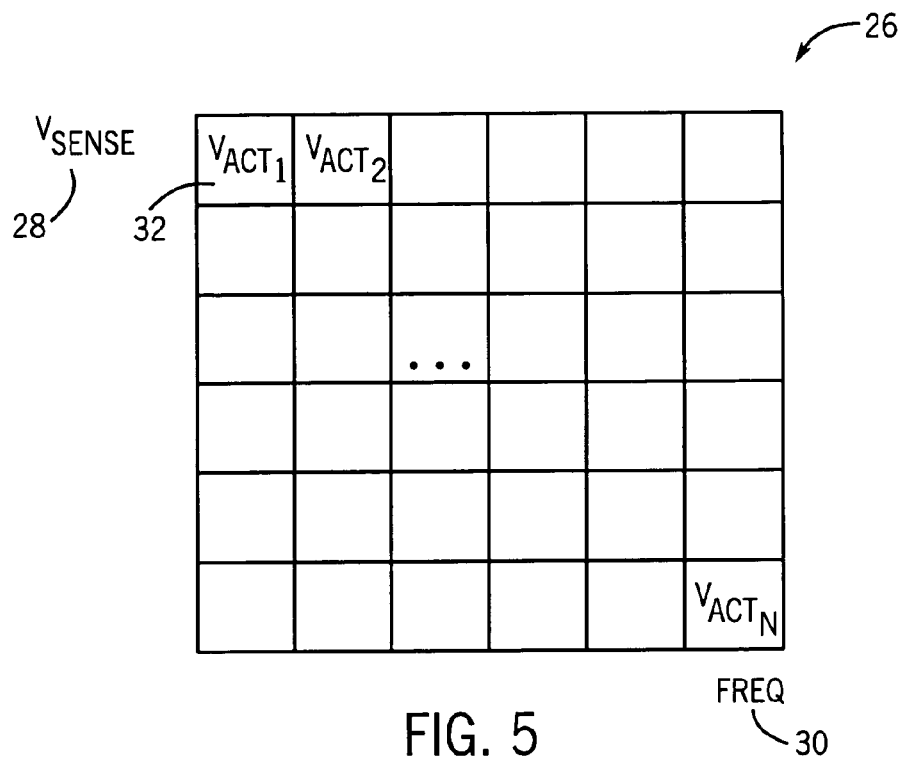
FIG. 5 is a block diagram illustrating a first look-up table which can be used in the control circuit of FIG. 2.

Referring now to FIG. 5, a diagram of a look-up table 26 for use in determining the actual output voltage of each phase of the generator 12 and utility 14 input power supplies based on the sensed voltage signal $V_{sense}$ 28 from the sensing circuit 22 is shown. The lookup table 26 comprises empirically determined data correlating actual voltage supplied by the power source 12 or 14 to the sensed voltage data. The empirically-derived data is specific to a selected transformer 42, and is acquired through testing of the transformer 42 coupled in the described circuit. Therefore, empirically-derived data must be obtained for each model or type of transformer 42. Despite the non-linearity of the high frequency transformer in the expected operational range, the empirical data provides an accurate correlation between the sensed $V_{sense}$ 28 and actual voltage $V_{actual}$ 32 supplied by each phase of the input line power 18 and 20 of the power sources 12 and 14.

Referring still to FIG. 5, the microprocessor 24 uses the voltage level $V_{sense}$ 28 and frequency 30 as indices into the two-dimensional look-up table 26 stored in memory component 27, which, as described above, correlates empirically-determined values of the actual input voltages $V_{actual}$ 32 to the sensed voltage $V_{sense}$ 28 and frequency 30. Based on these values the microprocessor 24 can determine an actual voltage value $V_{actual}$ 32 supplied by each phase of input line voltage from each of the power sources 12 and 14.

Referring again to FIG. 2, as noted above, the control circuit 19 can also include one or more temperature sensors 23 for sensing an ambient temperature level, particularly of the voltage sensing circuits 22 and the high frequency line matching transformers 42, which when operated outside of the expected frequency range as in the present case, are particularly sensitive to temperature changes. Temperature changes can be particularly problematic when the ATS is coupled to one or more AC generators which, during operation, produce heat. Furthermore, back-up systems are sometimes provided in small enclosed areas, where heat also tends to build.

To account for changes in the sensed voltage $V_{sense}$ 28 due to changes in ambient operating temperatures, the microprocessor 24 additionally reads a temperature level signal from the temperature sensor 23, and adjusts the voltage level $V_{actual}$ 32 based on the ambient temperature. The adjustment can be an offset applied directly to the $V_{actual}$ 32 value obtained from the look-up table 26 of FIG. 4, or determined from an empirically-derived equation. Alternatively, the temperature can provide an additional index into the look-up table 26.

Figure 6:
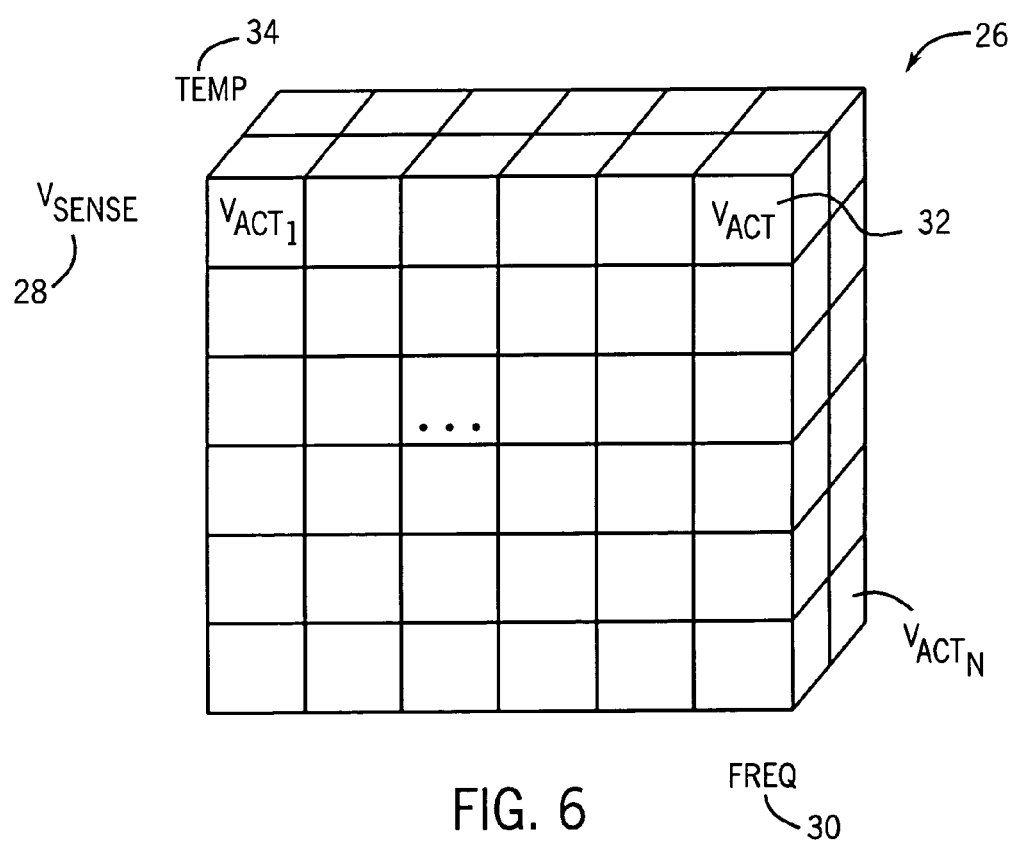
FIG. 6 is a block diagram illustrating a second look-up table which can be used in the control circuit of FIG. 2.

In practical applications, an empirically-derived equation has been shown in some cases to result in a linear offset which is easily calculated by the microprocessor 24. For more complicated data sets, other types of equations can be developed. Alternatively referring to FIG. 6 as noted above, the temperature can be applied as a third index into the look-up table 26, which, in this case, is three dimensional, expecting a $V_{sense}$ 28, frequency 30, and temperature sense 31 index value to determine the actual voltage $V_{actual}$ 32 supplied by the input lines of the AC power sources 12 and 14. As described above, the correlation between the temperature level, frequency, and voltage level provided in the look-up table 26 is derived empirically for a selected model or type of transformer 42.

Due to the use of the high frequency line matching transformer 42, the voltage sensing circuits 22 of the present invention are much smaller in size than those found in traditional ATS devices, thereby significantly decreasing the size of the overall system. Furthermore, these devices are significantly less expensive than those found in typical prior art devices, thereby decreasing the overall cost.

While a number of high frequency line transformers are available, one suitable transformer is the SMP-LP-5801 series surface mount line matching transformer commercially available from Bourns, Inc. of Riverside, Calif. The SM-LP-5801 is a small, subminiature transformer, designed for use in telecommunications, laptop computers, and instrumentation, and having a frequency voltage of ±0.25 dB in a range of 200–4 KHz. The line matching transformer has an operating temperature between zero and seventy degrees Celsius.

Using this transformer, empirical data correlating voltage output from an AC power source connected to the sensing circuit described with reference to FIG. 3 was developed as a function of the voltage and frequency of the sensed voltage 74 provided at the output of the sensing circuit 22, and also as a function of the temperature. In the sensing circuit 22, the resistors 46 and 48 each had a value of one hundred and thirty-three kilo-ohms, while the resistor 50 was 22 ohms, and the capacitor 52 has a capacitance value of one microfarad. In the RC filter comprising resistor 58 and capacitor 60, the resistor 58 had a value of 100 ohms while the capacitor was one microfarad. The resistors 64 and 62 on the input to the op amp 66 were each thirty-three kilo-ohms, while the RC circuit in the feedback loop comprised a capacitor 70 of 1500 pF and a resistor 68 of 100 kilo-ohms.

The empirical data relating the voltage output by a 60 Hz 120/240/360 V three phase system to a sensed voltage and frequency was tabulated and a look-up table constructed. The table was able to sufficiently correlate the sensed voltage and frequency to an appropriate AC power source line voltage level. Additional accuracy was achieved by providing an offset of the calculated voltage value based on a sensed temperature. When using this transformer, the output voltage was determined to vary linearly with increased temperature, and the offset could therefore be calculated by the microprocessor 24.

While the ATS 10 is described as coupled between a utility power source 14 and a generator 12, it will be apparent that the ATS 10 can also be connected to two generators 12, to multiple utility power sources 14 or combinations of these types of supplies, as well as other types of power supplies capable of supplying utility-level power. As described above, the voltages supplied by the AC power sources are typically utility-level line voltage levels, providing a 120/240/360 Volt three phase signal at sixty hertz. It will be apparent, however, that the voltage and frequency values can be varied, particularly based on local utility standards such as, as noted above, the fifty hertz European standard. Furthermore, although a specific sensing circuit has been shown, it will be apparent that variations can be made to the sensing circuit without departing from the invention. Additionally, although the processing unit has been described as a microprocessor, various other types of intelligent control devices could be similarly employed. Also, although the transformer has been described specifically as a high frequency line matching transformer, other small transformers high frequency transformers capable of repeatably producing a sensed voltage which can be correlated to an input voltage in a non-linear operational range below the expected frequency range of the transformer can also be used. Examples of such transformers are, for example, those useful in audio and other applications.

Additionally, although the look-up table is described as a two or three dimensional table, in some applications the sensed voltage can be correlated directly to an approximated actual voltage, and the actual voltage level adjusted to account for frequency and temperature variations. As described above, an equation can also be used, for example, when the relationship between the sensed and actual voltage is substantially linear. The adjustment can be provided as an offset, or as an empirically derived equation. In this application, a simple one dimensional table can be used. Each of the voltage, frequency, and temperature relationships can be represented by either empirically-derived equations or as look-up table data in any number of combinations. Furthermore, while the data structure for maintaining the empirically-derived data has been described throughout as a look-up table, it will be apparent that various other methods and structures for correlating data can also be used.

It should be understood, therefore, that the methods and apparatuses described above are only exemplary and do not limit the scope of the invention, and that various modifications could be made by those skilled in the art that would fall under the scope of the invention. To apprise the public of the scope of this invention, the following claims are made:

We claim:

1. An automatic transfer switch circuit for switching a utility-level line power supplied to a load between a first AC power source and a second AC power source, the automatic transfer switch circuit comprising:
    a first high frequency transformer electrically connected to a utility-level power line from the first AC power source;
    a second high frequency transformer electrically connected to a utility-level power line from the second AC power source; and
    a processing unit electrically connected to each of the first and second high frequency transformers to receive a sensed voltage signal indicative of a level of utility-level line voltage supplied by the respective power sources and to calculate a frequency of the sensed voltage signal, wherein the processing unit is programmed to determine an actual level of voltage supplied by at least one of the first and second AC power sources based on the sensed voltage signal and the frequency of the voltage signal, and to switch the power applied to the load from one of the first and second power sources to the other of the first and second power sources when the actual voltage applied to the load falls below a predetermined value.

2. The automatic transfer switch as defined in claim 1, further comprising a memory component storing a look-up table, the processing unit correlating the sensed voltage signal of the high frequency line transformer to a corresponding value retrieved from the look-up table to a stored value representing the actual voltage provided by at least one of the AC power sources.

3. The automatic transfer switch as defined in claim 2, wherein the processing unit is programmed to use the calculated frequency as an index into the look-up table.

4. The automatic transfer switch as defined in claim 1, wherein the processing unit calculates a frequency of the sensed voltage signal as a function of a time between successive zero crossing points of the sensed voltage signal.

5. The automatic transfer switch as defined in claim 1, wherein the processing unit is further programmed to sample the sensed voltage signal at a predetermined time after a zero crossing.

6. The automatic transfer switch as defined in claim 1, wherein each of the first and second AC power sources are three phase power sources, a high frequency transformer is coupled to at least two of the phases of each of the first and second AC power sources, and the processing unit calculates an actual voltage for each of the two phases of each of the first and second AC power sources.

7. The automatic transfer switch as defined in claim 1, wherein the AC power sources each supply a utility-level voltage operating in a frequency range between 50 and 60 Hertz.

8. The automatic transfer switch as defined in claim 1, wherein the high frequency transformer is a line matching transformer providing a linear transfer characteristic in the 200 Hz–4 KHz range.

9. An automatic transfer switch comprising:
    a first high frequency transformer electrically connected to a first AC power source and a second high frequency transformer electrically connected to a second AC power source producing a utility-level power supply, wherein one of the first and second AC power sources is electrically connected to a load to supply the utility power to the load;
    a processing unit electrically connected to each of the first and second high frequency transformers to receive a sensed voltage signal indicative of a level of output voltage of the respective power sources;
    a memory component storing a look-up table, the look-up table correlating a voltage level and a frequency of the sensed voltage signal to an actual voltage output from the one of the first and second AC power sources that is electrically connected to the load;
    wherein the processing unit is programmed to determine the frequency and the voltage level of the sensed signal and to correlate the sensed signal to the actual voltage level in the look-up table based on the voltage level of the sensed voltage signal and the frequency of the sensed voltage signal.

10. The automatic transfer switch as defined in claim 9, further comprising a temperature sensor, the temperature sensor providing a temperature level signal indicative of the ambient temperature of operation.

11. The automatic transfer switch as defined in claim 10, wherein the temperature level is an index into the look-up table.

12. The automatic transfer switch as defined in claim 9, wherein the look-up table comprises empirically-determined values.

13. The automatic transfer switch as defined in claim 9, wherein the processing unit is further programmed to calculate an offset based on the temperature level and to apply the offset to adjust the calculated actual voltage.

14. The automatic transfer switch as defined in claim 13, wherein the calculation is based on an empirically derived equation correlating the actual voltage to the temperature.

15. The automatic transfer switch as defined in claim 14, wherein the equation is a linear equation.

16. A voltage sensing circuit for sensing a level of an applied utility-level line voltage provided by an AC power supply providing utility power, the voltage sensing circuit comprising:

a processing unit;

a high frequency line matching transformer electrically coupled to an AC power source and to the processing unit to provide a sensed voltage level to the processing unit; and a temperature sensor coupled to the processing unit to provide a temperature sense signal;

wherein the processing unit is programmed to sample a level of the sensed voltage from the high frequency line transformer, calculate a frequency of the sensed voltage and to determine an actual voltage provided by the AC power source based on the sensed voltage, the frequency, and the temperature.

17. The voltage sensing circuit as defined in claim 16 further comprising a memory component storing a look-up table, the look-up table correlating the sensed voltage to the actual voltage.

18. The voltage sensing circuit as defined in claim 17 wherein the look-up table correlates a frequency to an actual voltage.

19. The voltage sensing circuit as defined in claim 16, wherein the microprocessor is programmed to adjust the actual voltage based on the temperature level.

20. The voltage sensing circuit as defined in claim 17, wherein the temperature level is an index into the look-up table.

21. The voltage sensing circuit as defined in claim 16, further comprising a voltage divider connected between the AC power line and the high frequency line transformer.

22. The voltage sensing circuit as defined in claim 16, further comprising a filter circuit electrically connected between the high frequency transformer and the processing unit for filtering the sensed voltage.

* * * * *